April 29, 1969

G. H. COLLENS 3,441,760

FRAME FOR DYNAMOELECTRIC MACHINE WITH RELUCTANCE VARYING
MAGNETIC SHIM SPACE

Filed June 29, 1967

INVENTOR.
GRANGER H. COLLENS
BY Woodling, Krost,
Granger and Rust
ATTORNEYS.

United States Patent Office 3,441,760
Patented Apr. 29, 1969

3,441,760
FRAME FOR DYNAMOELECTRIC MACHINE WITH RELUCTANCE VARYING MAGNETIC SHIM SPACE
Granger H. Collens, Shaker Heights, Ohio, assignor to The Reliance Electric and Engineering Company, a corporation of Ohio
Filed June 29, 1967, Ser. No. 650,070
Int. Cl. H02k 5/04
U.S. Cl. 310—91                                    22 Claims

ABSTRACT OF THE DISCLOSURE

A dynamoelectric machine stator assembly having main poles and interpoles. The main poles are integral with the yoke, and pole shoes are fastened to the main poles with keys and cooperating grooves. Slots in the yoke receive separate interpoles which are fastened to the yoke with keys and cooperating grooves. The interpoles have additional grooves on the distal ends whereby the interpole ends may be interchanged to obtain a different air space. Elongated narrow apertures are provided in the yoke opposite the main poles for receiving reluctance varying magnetic shims. Such shims may also be inserted in the bottom of the yoke slots receiving the interpoles and between the main pole faces and pole shoes. Foot locator notches and metal foot bars are provided on the lower part of the stator frame for accurately establishing the machine shaft height.

Background of the invention

In dynamoelectric machines of the alternating current type, it has been customary to use laminations of magnetically permeable material to reduce hysteresis and eddy current losses. However, in a direct current machine carrying a direct flux, it has been customary to provide a solid ferrous frame made of either cast iron, for example or heavy plate rolled into a ring and welded as the annular yoke of the field frame assembly. Extending generally inwardly from this yoke, salient pole pairs are provided to carry field windings to cooperate with the rotor. The customary DC motor has a commutator supplying fairly large currents to armature windings on the rotor which cooperate with the DC field windings on the salient poles.

In recent years, there has been an increasing trend toward operation of direct current motors from rectified solid state power supplies, and this usage has increased because of the decreasing cost and size of such solid state power supplies. This gives a variable voltage direct current supply in order to obtain variable output speed of the direct current motor. However, use of low-cost competitive circuits of solid state power supplies has resulted in considerable alternating current ripple superimposed on the direct current, and this ripple has caused an increased power loss in the motor by hysteresis and eddy current. Eddy current losses cause the compensating flux to lag the armature current resulting in excessive sparkling at the brushes. The conventional round rolled ring carbon steel field frames or cast iron frames do not respond well in the circuit of the interpoles using this rectified power with AC ripple, unless chokes or more sophisticated control circuitry of the power supplies is used.

In addition, main pole and interpole space is limited and wasteful of space in a cylindrical field ring, and this condition then essentially limits available armature space for any given shaft height dimension. Also in solid frames there is considerable machining which must be done such as drilling and tapping holes in the frame to mount the main poles and field poles. Additionally, there is a problem of a good fit of the pole piece or pole shank to the annular yoke and to make these pole pieces removable so that the coil may be separately wound and then placed on the pole piece. If the pole piece were not removable or some part thereof removable, then the field coil would have to be wound in place which is much more expensive in time and labor. To make the pole shoe or the pole shank removable, means more parts must be machined so that these parts may interfit and additionally holes must be drilled and tapped to provide this attachment. Still further, during assembly and initial testing, the flux distribution was usually found to be less than perfect and combinations of magnetic and nonmagnetic metal shims had to be disposed in the flux path usually between the pole shank and the annular yoke. This required that the pole shank be bolted and unbolted and different shims tried during the initial test in order to achieve the proper balance of flux. This involved time and hand work in the testing which increased the cost of the DC motor. Also a conventional rolled ring frame for a four pole machine requires a minimum of 16 pole attachment holes drilled radially in the yoke of the frame plus 16 drilled and tapped holes in the field poles and interpoles themselves. Still further, the nonmagnetic shims used increased the eddy current losses to increase the total losses of the machine.

Accordingly an object of the invention is to provide a magnetic frame assembly for a dynamoelectric machine which obviates the above mentioned disadvantages.

Another object of the invention is to provide a magnetic frame assembly wherein parts may be selectively keyed together for simple and quick fastening and precise alignment.

Another object of the invention is to provide a magnetic frame assembly with a narrow aperture which will accommodate magnetic shims to vary the reluctance in the flux path.

Summary of the invention

The invention may be incorporated in a magnetic frame assembly for a dynamoelectric machine, comprising, in combination, yoke means and pole piece means, said pole piece means including at least one pole piece having a pole shank and a pole shoe, an elongated narrow aperture in said frame assembly in the path of flux through said frame assembly with a long dimension of said aperture transverse to said flux path and a small dimension of said aperture generally parallel to said flux path, a first groove in said pole shank, a complementary second groove in one of said pole shoe and yoke means, key means fastening said pole shank to said one of said pole shoe and yoke means and including a key in said first and second grooves, said aperture accommodating loose magnetic shims and air space to vary the reluctance to the flux in said path while retaining said pole shank firmly attached to said one of said pole shoe and yoke means by said key means.

Other objects and a fuller understanding of the invention may be had by referring to the following description and claims, taken in conjunction with the accompanying drawing.

Figure 1:
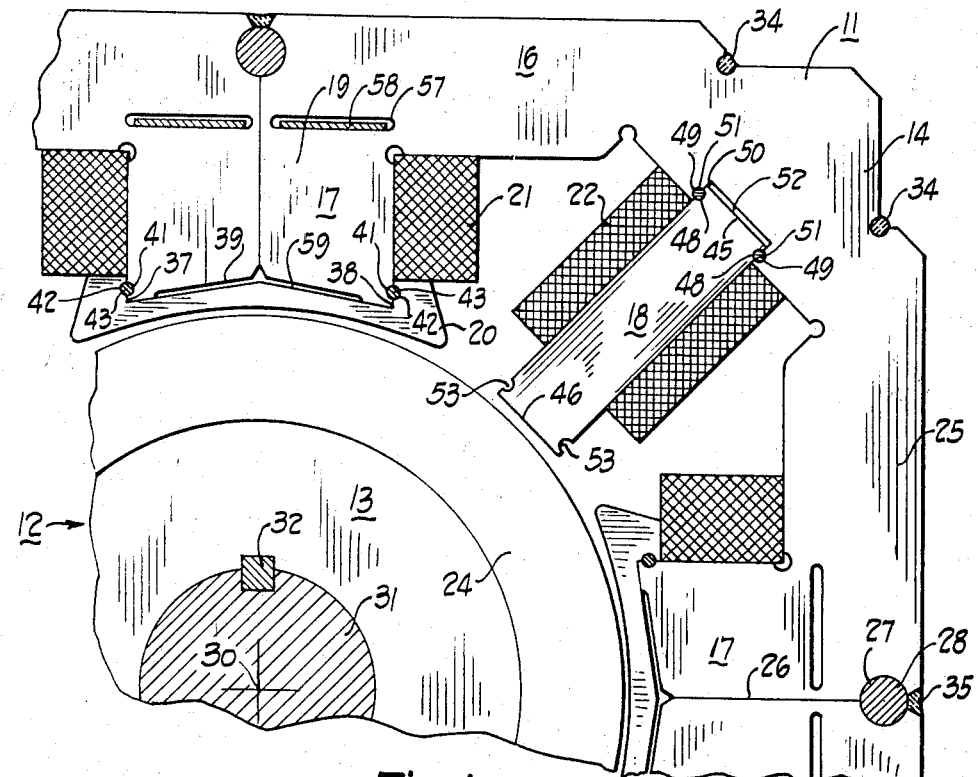
FIGURE 1 is an elevational sectional view of a frame assembly for a dynamoelectric machine embodying the invention.

The invention may be incorporated in a frame assembly 11 of magnetically permeable material for a dynamoelectric machine 12. The dynamoelectric machine 12 includes generally a rotor 13 and a stator 14 with the stator including the frame assembly 11. The frame assembly 11 is shown as being used with a four pole machine and includes an annular yoke 16 which extends completely around the rotor 13. Pole pieces are also included in the frame assembly 11, in this case extending generally radially inwardly from the annular yoke 16. These pole pieces include main pole pieces 17 and interpoles 18. The main pole pieces 17 include a pole shank 19 and a pole shoe 20 shown as removable. A coil 21 surrounds the pole shank 19 and coil 22 surrounds the interpole 18 to be energizable to establish the field in this dynamoelectric machine 12. As one example, this may be a direct current machine operable from rectified alternating current power which will have a direct current component but also an alternating current ripple. In this case of a direct current machine such as a direct current motor, the coils 21 and 22 would establish a direct flux to cooperate with the rotor or armature 13. The rotor 13 may have the usual armature windings 24 for cooperation with the poles of the stator 14.

The annular yoke 16 is preferably made from laminations of magnetically permeable material and may be a single piece lamination circumscribing the entire yoke, or in order to save lamination steel, they may be formed in segments 25, as shown in FIGURE 1. Four such segments 25 are shown for this four pole machine. The segments abut adjacent segments on radial lines 26 and grooves 27 may be provided in these radial abutment surfaces 26 to accommodate a mounting stud 28. End brackets may be mounted on these mounting studs 28 for accurate alignment of the bearings in the end brackets journalling the rotor 13. The radial abutment line 26, if extended, would pass through the axis 30 of the shaft 31 to which the rotor 13 is keyed by the key 32. The lamination segments 25 may be welded together at 34 and also the mounting studs 28 may be welded in place at 35.

The pole shoe 20 has a slot defined by opposing surfaces 37 and 38. The distal end 39 of pole shank 19 has surfaces received in this slot 37–38. Also this distal end 39 of the pole shank 19 has first grooves 41 facing these opposing surfaces 37 and 38. Second grooves 42 are provided in the opposing surfaces 37 and 38 complementary to and facing oppositely to the first grooves 41. These grooves may be semicylindrical as shown and accommodate cylindrical pins 43. These pins or keys 43 accordingly retain the pole shoe 20 on the pole shank 19 to complete the main pole piece 17. The pins 43 may be of the same axial length as the pole pieces and inserted parallel to the axis 30 and may be removed along the same direction. In assembly, the coil 21 is first slipped over the pole shank 19, the pole shoe 20 slipped over the distal end 39 and then the cylindrical pins 43 are positioned longitudinally of the length of these grooves 41 and 42. The pins 43 are preferably of magnetically permeable material in order to enhance the flow of flux into the outer extremities of the pole shoe 20.

The interpole 18 has ends 45 and 46. In the position shown in FIGURE 1, end 46 is the distal end establishing a pole shoe with an air gap relative to the rotor 13. The pole shank of the interpole 18 has first grooves 48 on opposite sides of the proximal end 45. Second grooves 49 are formed in opposing surfaces of a shallow slot 50 in the annular yoke 16. Pins 51 shown as cylindrical pins are disposed in the first and second grooves 48 and 49 in order to key or fasten the interpole 18 to the yoke 16. Preferably these pins 51 are nonmagnetic pins in order to force the flux to jump an air gap 52 at the base or proximal end 45 of the interpole 18.

Third grooves 53 are provided in opposite sides of the end 46 of the interpole 18. These grooves 53 are disposed at a different distance from end 46 than the distance of the first grooves 48 from the end 45 of the interpole shank 18. Accordingly, this permits removing the pins 51, turning the interpole 18 end for end and reinserting the pins 51 in the grooves 49 and 53 and this will establish a second air gap which is different from the air gap 52. This permits a trimming of the reluctance in the flux path of this interpole 18 by the simple expedient of turning this interpole end for end. If desired, magnetic shims may also be placed in the air gap 52 for further trimming of this flux. Because the interpole 18 is fixedly fastened or keyed to the yoke 16 by the pins 51, it is not necessary to make the shims fit tightly in the air gap slot 52. Such tight fitting shims were the rule in the prior art designs which used bolts extending through the yoke into tapped holes in the interpole. In such case, it was necessary to pack the air gap full of shims, either magnetic or non-magnetic shims, or both, in order to fix the interpole to the yoke 16. In this present case, however, the fastening is done independent of any spacing in the air gap 52. Accordingly, even less shims may be put in this air gap 52, and they will not rattle because of the magnetic attraction which holds these shims in place. In the present construction, the required number of magnetic shims 58 may be used and then brass or other nonmagnetic shims need not be used, instead air space may be used which eliminates the formed eddy current losses in the prior art brass shims.

An elongated narrow aperture 57 is provided in the frame assembly 11 at the base or proximal end of the main pole shank 19. This narrow aperture has a long dimension transverse to the length of the pole shank 19 and hence it is transverse to the flux path through this pole shank 19. The aperture 57 is thin or has a small dimension generally parallel to the flux path between the pole shank 19 and yoke 16. This elongated narrow aperture may be punched in the lamination segments 25 and be a completely closed aperture capable of accommodating magnetic shims 58. These magnetic shims 58 need not be packed full in this aperture 57 as was the usual requirement in the prior art construction which used magnetic and nonmagnetic shims in a stack to achieve the required pole shoe spacing relative to the rotor 13, and then this pole shank was bolted to the yoke.

An elongated narrow aperture 59 may also be provided between the distal end 39 of the pole shank 19 and the pole shoe 20. This may easily be provided and yet the pole shoe 20 held firmly in place because the attachment of the pole shoe is effected by the magnetic pins 43. This elongated narrow aperture 59 also has a long dimension transverse to the flux path and a small dimension generally parallel to the flux path. Loose magnetic shims may also be accommodated in this aperture 59. In many constructions, only one of the apertures 57 or 59 will be needed and will permit adequate insertion of sufficient shims to trim or equalize the reluctance of the flux paths in the frame assembly 11.

Figure 4:
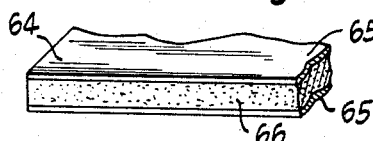
FIGURES 4 and 5 are two different embodiments of magnetic shims usable in the frame assembly.

FIGURE 4 shows a magnetic shim 64 which may be used in any one of the air gap apertures 52, 57 or 59. This magnetic shim 64 may be constructed of two layers of glass fiber cloth 65 and positioned therebetween is a mixture of magnetically permeable particles, such as iron powder 66, held in place by a binder such as a resin or other adhesive. Such magnetic shims 64 may be made quite thin so that they may be stacked in the air gap apertures as required.

Figure 5:
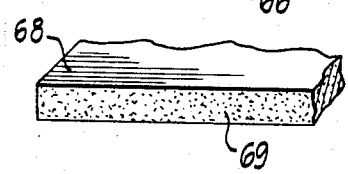

FIGURE 5 shows an alternative magnetic shim 68 which may be formed of a mixture of magnetic particles 69 and a binder. The magnetic particles may be iron or other ferrous powder and the binder may be copper or a copper alloy sintered to fuse the magnetic particles into a rigid flat shim plate. Again such magnetic shims 68 may be used in any one of the air gap apertures 52, 57 or 59.

Figure 2:
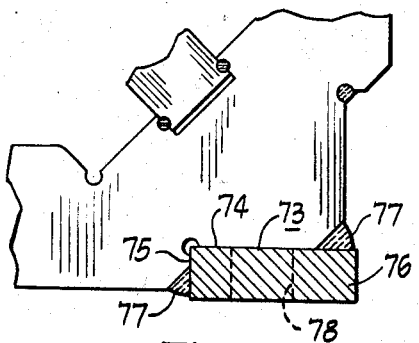

The yoke segments 25 include a foot locator notch 73, FIGURE 2, which includes a locator surface 74 and a shoulder 75 substantially perpendicular thereto. For the sake of symmetry in the lamination segments, these locator notches may be found at the top of the machine frame 11 as well as at the bottom as shown in FIGURE 2. This foot locator notch is on the outer periphery of the frame 11 and generally at about a 45 degree angle relative to a radius from the central axis 30 of the frame assembly 11. A metal foot bar 76 is disposed in this foot locator notch 73 in engagement with both the locator surface 74 and the shoulder 75. This foot bar 76 may be fastened to the frame assembly 11 as by welding at 77 which weld may also be used to secure the segments together. A foot mounting hole 78 may be provided through the foot bar 76.

Figure 3:
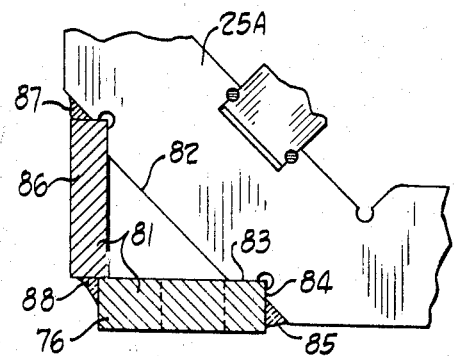
FIGURES 2 and 3 are partial elevational views of a mount for the frame assembly.

FIGURE 3 illustrates a modified form of foot 81. The annular yoke 16 may be formed from a modified yoke section 25A which has the outer corner cut off at 82. The outer periphery of this yoke segment 25A has a locator surface 83 and a shouder 84 together defining the locator notch. The foot bar 76 is positioned in the notch in engagement with the locator surface 83 and shoulder 84 and welded to the yoke segments 25A at 85. A foot brace 86 is welded at 87 to the yoke segments 85 and at 88 to the foot bar 76 to stiffen this foot bar and hold it in a definite position.

The foot bar 76, being positioned by the locator surface 83 and shoulder 84, or locator surface 74 and shoulder 75, will establish this foot bar at a definite distance relative to the axis 30. This is because the radial abutment lines 26 of the yoke segments 25 pass through the axis 30 within a very close tolerance by being die stamped laminations. All of these laminations being punched from one lamination die will produce repetitive frame assemblies 11 within the critical dimensions of shaft height relative to the bottom of the foot bars 76 is easily within the N.E.M.A. standards.

Currently for this size of machine, the N.E.M.A. standards are that the shaft height must be established within .030". This may easily be achieved even with close commercial tolerance metal bars in both width and thickness. This eliminates machining the bottom of the foot bars to achieve the correct shaft height and assures repetitive accuracy of shaft height in mass production of these machines. The foot bars are postioned near the outer extremities of the frame assembly 11 for rigid mounting of the entire dynamoelectric machine 12.

During assembly of the frame 11, it is not necessary to bolt and unbolt the pole shanks to the yoke 16 while different thicknesses of shims and nonmagnetic shims are tried. This was common in former prior art practice in order to achieve trimming of the flux to achieve substantial equality of reluctance of the various flux paths. In the present system, the high degree of uniformity from one machine to the next means that the flux trimming may to a greater extent be built into the lamination die and thus all four poles in the four pole machine, for example, will have substantially equal reluctance to the flux. What little flux trimming is necessary can be achieved without the necessity of unbolting or removing any of the pole pieces. With a minimum of 16 bolts fastening the pole pieces to the yoke in a prior art four pole machine, this was quite time consuming. Now the air gap apertures 52, 57 and 59 are all accessible from the longitudinal ends of the machine even with the coils 21 and 22 in place and with the rotor 13 in place. Shims such as the shims 64 and 68 or other magnetic shims may thus be longitudinally removed or moved into place in these air gap apertures to quickly achieve any additional required trimming of the flux. Also the interpoles 18 may be trimmed by removing the pins 51 longitudinally, turning the interpole end for end and reinserting the pins. This will achieve a different air gap space and hence a different flux trimming as stated above. The interpole coil 22 may be fastened in place, for example, by cementing or other means, either before or after the proper flux trimming is achieved.

The present invention permits trimming of the interpole flux by turning the interpole end for end and reinserting with a pin or key to achieve a different space. Also trimming of the flux is achieved by a varying number of shims in a narrow slot or aperture. When brass or other non-magnetic shims would be used in the prior art to weaken the flux, air is substituted plus loose magnetic shims if required and no rattling of these magnetic shims occurs.

The present design also permits mounting feet for the dynamoelectric machine to be placed directly in notches in the annular yake of the frame assembly to achieve proper height of the shaft according to N.E.M.A. standards and within the N.E.M.A. mounting tolerances without any machining on the foot bars.

The present invention also permits an extremely accurate field frame and pole assembly which can be produced without machining. The position of the poles on the annular yoke is achieved without machining and this permits the symmetry of the machine so that the reluctance of the various flux paths are nearly equal thus requiring very little trimming of the flux path by shims. Also drilling and tapping of holes to mount the pole pieces is eliminated and the poles may be quickly assembled and disassembled.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:

1. A magnetic frame assembly for a dynamoelectric machine, comprising, in combination:
   yoke means and pole piece means,
   said pole piece means including at least one pole piece having a pole shank and a pole shoe,
   an elongated narrow aperture in said frame assembly in the path of flux through said frame assembly with a long dimension of said aperture transverse to said flux path and a small dimension of said aperture generally parallel to said flux path,
   a first groove in said pole shank,
   a complementary second groove in one of said pole shoe and yoke means,
   key means fastening said pole shank to said one of said pole shoe and yoke means and including a key in said first and second grooves,
   and said aperture accommodating loose magnetic shims and air space to vary the reluctance to the flux in said path while retaining said pole shank firmly attached to said one of said pole shoe and yoke means by said key means.

2. A frame assembly as set forth in claim 1, wherein said pole shoe is laminated.

3. A frame assembly as set forth in claim 1, including direct current winding means on said frame assembly.

4. A frame assembly as set forth in claim 1, wherein said yoke means is in the form of a continuous annular path and includes a series of laminations.

5. A frame assembly as set forth in claim 1, wherein said pole shank is fabricated from a stack of laminations.

6. A frame assembly as set forth in claim 1, including said yoke means and said pole shank being unitary.

7. A frame assembly as set forth in claim 1, wherein said pole piece is a main pole piece.

8. A frame assembly as set forth in claim 1, wherein said pole shank is an interpole.

9. A frame assembly as set forth in claim 1, wherein said elongated narrow aperture is in the area of the junction of the pole shank and the yoke means.

10. A frame assembly as set forth in claim 1, wherein said elongated narrow aperture is in the area of the junction of said pole shank and said pole shoe.

11. A frame assembly as set forth in claim 1, wherein said key means fastens said pole shank to said pole shoe.

12. A frame assembly as set forth in claim 1, wherein said key means fastens said pole shank to said yoke means.

13. A frame assembly as set forth in claim 1, wherein said key means is a cylindrical bar fitting generally semi-cylindrical first and second grooves.

14. A frame assembly as set forth in claim 1, including side portions of the pole shoe overlying the inner end of the pole shank,
and said key means including a key in first and second grooves in the pole shank and pole shoe, respectively.

15. A frame assembly as set forth in claim 14, wherein said key means includes an additional key in complementary grooves in the other side portion of the pole shoe and the pole shank.

16. A frame assembly as set forth in claim 1, wherein said pole piece is an interpole having semi-circular first grooves near one end thereof,
semicircular second grooves in said opposed surfaces complementary to and directed oppositely to the semicircular first grooves,
said key means including nonmagnetic cylindrical pins disposed in said semicircular grooves between the interpole and the yoke means and parallel to the axis of said frame assembly to maintain the interpole in place with a first gap between the bottom of the interpole and said yoke means,
and semicircular third grooves on the opposite end of said interpole disposed at a different distance than said first grooves from the respective end thereof, thereby permitting turning the interpole end for end and fastening in place with the nonmagnetic pins to establish a second air gap spacing between the interpole and the yoke means thereby permitting trimming of the flux in the interpole by turning the interpole end for end.

17. A frame assembly as set forth in claim 1, including a foot locator notch in said yoke means having a locator surface,
a shoulder substantially perpendicular to said locator surface,
said locator surface and shoulder being on the outer periphery of said frame assembly,
and a metal foot bar of commercial tolerance width and thickness dimensions welded in said foot locator notch in engagement with said locator surface and said shoulder as a mounting foot for the dynamoelectric machine.

18. A frame assembly as set forth in claim 17, wherein said locator surface is substantially as wide as said foot bar.

19. A frame assembly as set forth in claim 1, including said frame being laminated,
a foot locator notch in said yoke means having a locator surface at about a 45 degree angle relative to a radius from the central axis of the frame assembly,
a shoulder substantially perpendicular to said locator surface,
said locator surface and shoulder being on the outer periphery of said frame assembly,
a metal bar of commercial tolerance width and thickness dimensions welded in said foot locator notch in engagement with said locator surface and said shoulder as a mounting foot for the dynamoelectric machine with the bottom of the mounting foot established at a dimension relative to said central axis within 0.015 inch without any machining of said mounting foot.

20. A frame assembly as set forth in claim 1, including a magnetic shim in said aperture,
said shim comprising a powdered magnetically permeable material and a binder fastening said permeable material into a flat thin rigid mass.

21. A frame assembly as set forth in claim 20, including a glass cloth layer on the two outer surfaces of said shim, and wherein said binder is a hardened resin.

22. A frame assembly as set forth in claim 20, wherein said permeable material and binder is a sintered mixture of ferrous and copper particles.

References Cited

UNITED STATES PATENTS

| | | | |
|---|---|---|---|
| 1,485,393 | 3/1924 | Hall | 310—218 |
| 1,929,787 | 10/1933 | Mudge | 310—218 |
| 2,308,028 | 1/1943 | Rose et al. | 310—218 |

WARREN E. RAY, *Primary Examiner.*

U.S. Cl. X.R.

310—186, 191, 192, 218, 259